July 5, 1927.

R. A. DICKINSON

1,635,035

MACHINE FOR WRAPPING FRUIT AND OTHER ARTICLES

Filed Feb. 20, 1926

July 5, 1927.  R. A. DICKINSON  1,635,035
MACHINE FOR WRAPPING FRUIT AND OTHER ARTICLES
Filed Feb. 20, 1926    6 Sheets-Sheet 5

INVENTOR
Raymond A. Dickinson,
By Parker & Prochnow,
ATTORNEYS

Patented July 5, 1927.

1,635,035

UNITED STATES PATENT OFFICE.

RAYMOND A. DICKINSON, OF APPLETON, NEW YORK.

MACHINE FOR WRAPPING FRUIT AND OTHER ARTICLES.

Application filed February 20, 1926. Serial No. 89,787.

This invention relates to machines for wrapping a sheet of paper or other material around fruit or other round or partly round articles.

The objects of this invention are to provide a machine of this kind, which is so organized that the machine may operate at a high rate of speed without damage to the fruit or other articles to be wrapped or to the wrapping sheets; also to provide a machine of this kind with an improved holder for the articles which holds the articles while they are wrapped; also to provide means of improved construction for discharging the wrapped articles from the holder; also to provide means of improved construction for feeding the articles and the sheets to the holder; also to provide mechanism of improved construction for actuating the various mechanisms of the machine; also to provide a machine of this kind in which the sheet, after the same has been wrapped around the article, is twisted or clinched so as to secure the same in place thereon; also to improve the construction of machines of this kind in the other respects hereinafter specified.

Briefly stated, the machine includes a revolving article holder or chuck including article supporting fingers over which the sheet of wrapping material is fed, and the article is then dropped onto the sheet into the revolving holder, carrying the sheet with it, the vertical axis of the article being approximately coincident with the axis of rotation of the holder. The ends of the sheet extend upwardly around the sides of the article and are engaged by devices which bring these edges together over the revolving article and cause these portions of the sheet to be twisted together. The twisted portions are then preferably compressed or flattened out by a plunger or presser foot, thus securing the sheet on the article. The article is then ejected by causing the supporting fingers to release the same, whereupon the operation of the machine is repeated. The various parts of the machine are automatically actuated so that each functions at the proper time.

A represents a chute or feed trough to which the articles X are supplied, and along which they roll to a feed wheel B which is provided with suitable pockets formed by radial webs 15 extending between two disks 16, thus forming pockets into which individual articles may be received. The feed wheel B is mounted on the shaft 17 which is rotated by means of mechanism which will be hereinafter described. It can be clearly seen in Fig. 3 that a quarter of a revolution of the feed wheel B will cause an article X contained in one of the pockets of the wheel to be discharged into a guide ring C which is suitably secured on the machine, which directs the article downwardly into a holder or chuck D. Obviously other means for feeding the articles to the holder or chuck may be used without departing from this invention.

E represents a feed table on which a stack of sheets Y is supported. In the particular embodiment of the invention shown in the drawings, the table E is vertically movable on guides 20, Fig. 3, arranged on a frame member 21 of the machine, and the feed table E may be raised and lowered by means of a screw 22 engaging a threaded lug 23 of the feed table so that the upper sheet of the stack may be arranged at a correct elevation to enable this sheet to be fed laterally from the top of the stack to a sheet supporting plate or table F. This table is arranged over the article holder or chuck D, and has a hole or opening 25 therein over the holder, through which the article X may be dropped. The sheet Y is fed over the hole 25 in the table F before the article is dropped through the guide frame C so that the article in dropping into the holder D carries the sheet with it, the edges of the sheet extending upwardly, as indicated in Fig. 3, by Y'.

Figures 3, 4, 5:
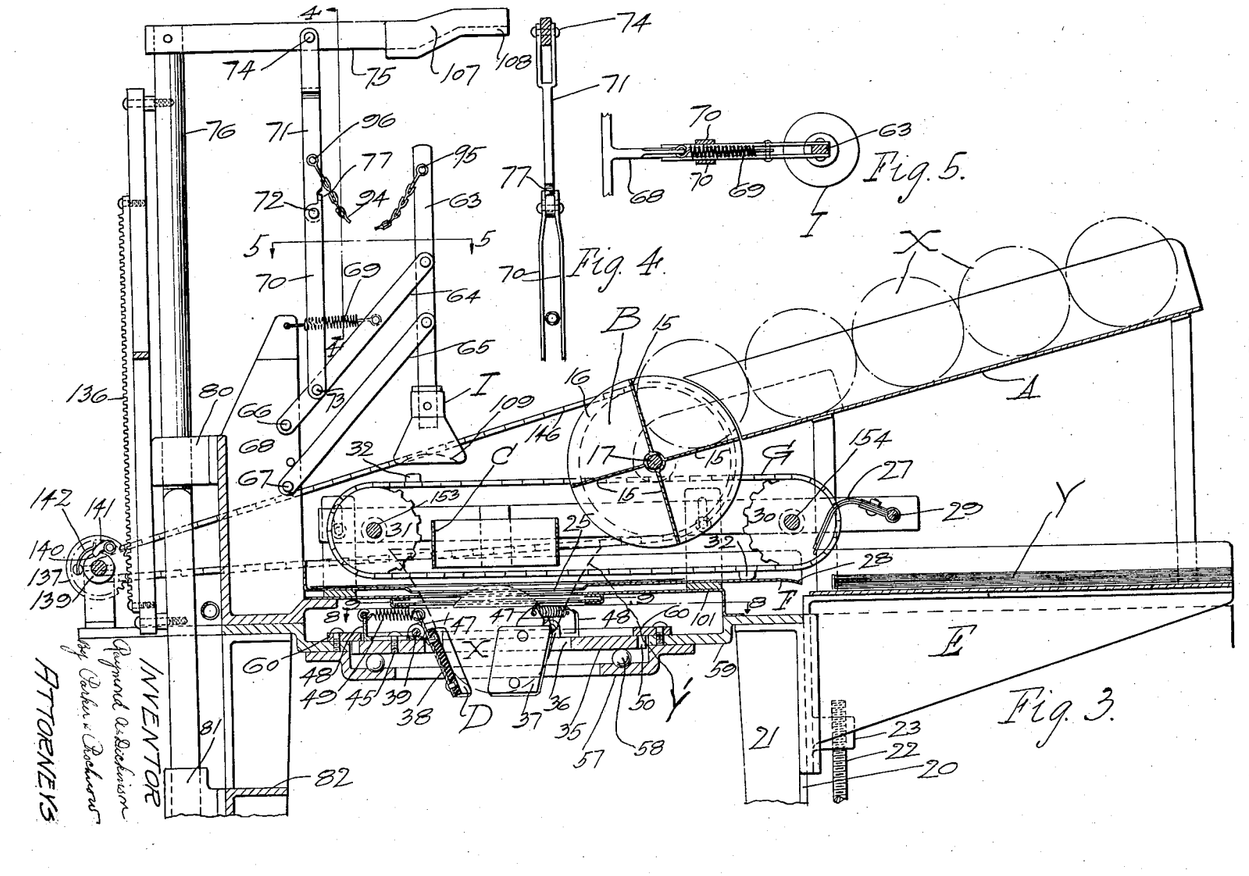
Fig. 3 is a sectional elevation thereof on line 2—2, Fig. 1.
Fig. 4 is a fragmentary sectional elevation thereof on line 4—4, Fig. 3.
Fig. 5 is a fragmentary plan view thereof on line 5—5, Fig. 3.

The sheet feeding mechanism may be of any suitable or desired construction, that shown including a pair of rotary wipers or brushes 27 made of rubber or other frictional material, which are adapted to rotate in the direction indicated by the arrow in Fig. 3, and in doing so, contact with the upper sheet of the stack and draw the edge of the sheet upon the sheet supporting plate or table F, the edge of the table or plate nearest to the stack of sheets being flared downwardly for this purpose, as indicated at 28. The wiper members 27 are mounted on a shaft 29 which is rotated by means of mechanism hereinafter described. The feeding of the sheet from this position, in which it is left by the brushes or wipers 27, to its position over the opening in the plate or table F is effected by means of a pair of chains or belts G passing over sprocket wheels 30 and 31, and provided with one or more friction lugs or projections 32 which may also be made of rubber and which are adapted to engage the opposite sides of a sheet which has been placed upon the table or plate F, and by pressing the sheet against the smooth surface of this table or plate, move the same forwardly until the sheet is in the desired position, whereupon the friction lugs 32 pass upwardly around the sprocket wheels 31 out of engagement with the sheet. In order to prevent the leading edge of the sheet from being caught on the edge of the hole or opening 25 in the table or plate F, and to prevent damage to the sheet when the same is drawn through the hole by an article, the edge of this hole or opening is flared downwardly. It will be obvious, of course, that sheet feeding mechanism of any other suitable or desired construction for supplying a sheet at a time to the table or plate F may be provided if desired.

Figure 8:
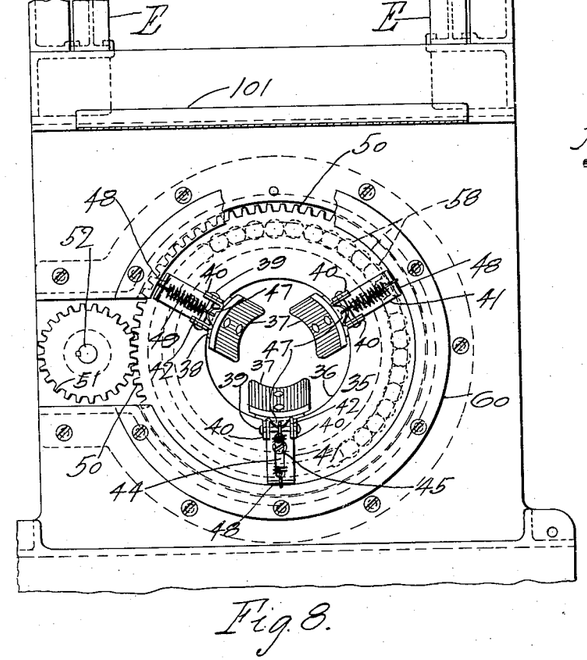
Fig. 8 is a sectional plan view thereof on line 8—8, Fig. 3.

The revolving holder or chuck into which the article to be wrapped enters while carrying a sheet of wrapping material with it, may be of any suitable or desired construction, that shown including a rotary disk or ring 35 having a plurality of article-supporting fingers or plates mounted thereon and preferably extending into a central hole or opening 36 therein. In the particular construction shown, these fingers or plates are made of pads or cushions 37 of rubber or other resilient material with which the articles may contact, the pads or cushions being secured to plates 38 which are pivotally mounted as at 39 on the rotary disk or ring 35. Three of these fingers or article-supporting members are shown in the particular construction illustrated, but a greater or less number may be used, if desired. The pivots or pins 39 about which the plates 38 may swing are preferably journalled in lugs 40 extending upwardly from supporting plates or brackets 41 which are adjustably mounted on the rotary disk or ring 35 of the holder, and in the construction shown, the plates 38 are also provided with integral, rearwardly bent lugs 42, Figs. 8 and 13, through which the pivots 39 extend. The supporting plates 41 are provided with slots 44 through which clamping screws 45 extend, which enter into threaded holes in the rotary disk or plate 35. Consequently, by loosening the screws 45, the supporting plates or brackets 41 may be moved toward and from the axis of rotation of the disk or ring 35, so that the machine may be readily adapted to operate on articles of different sizes.

Figure 6:
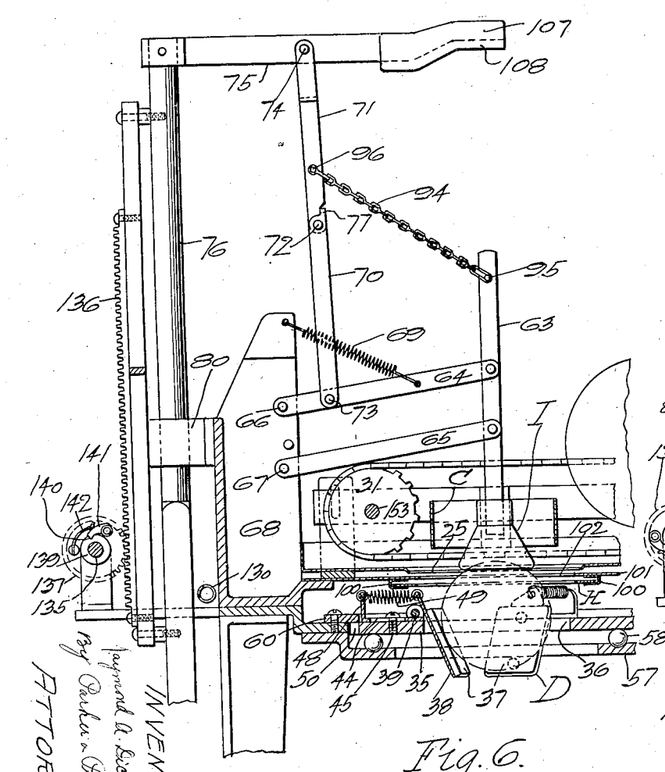
Figs. 6 and 7 are fragmentary, longitudinal, sectional elevations thereof, similar to Fig. 3, but showing parts of the machine in different positions.
Figure 7:
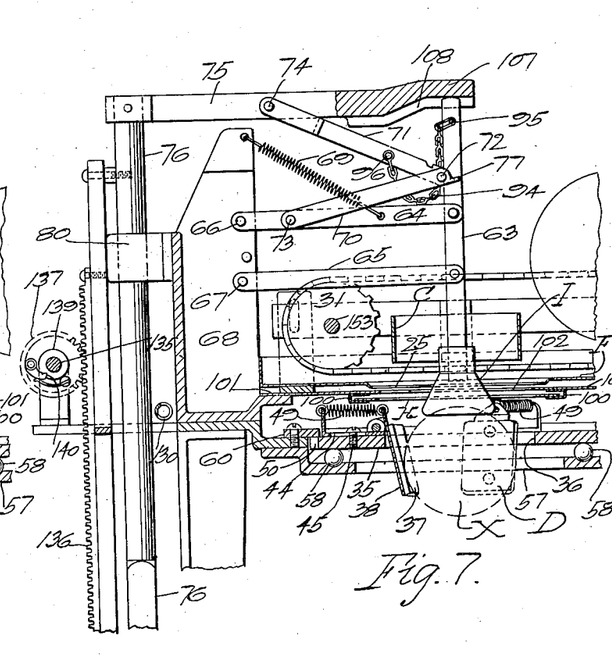

The article-supporting fingers or members of the holder or chuck D are normally held in their article-supporting positions, and are adapted to be moved out of these positions to permit the article to be discharged out of the machine. Any suitable means may be provided for holding the article-supporting fingers in their article-supporting positions, yielding means being used in the construction shown, in which the rear plate 38 of each article supporting finger is provided with an upwardly extending projection 47, and the supporting plate 41 is also provided at its rear end with an upwardly extending part 48, and coil springs 49 are preferably stretched between the projections 47 and 48 to hold the article retaining fingers in their inclined or article-supporting positions, as shown in Figs. 3 and 6. These springs, however, will stretch and permit the article-supporting fingers to yield, as indicated in Fig. 7, to permit the article to be discharged downwardly from the holder D.

The rotation of the ring or disk 35 may be effected in any suitable or desired manner. In the particular construction illustrated, the outer periphery of this disk or plate is provided with gear teeth 50 which are adapted to mesh with a pinion 51, see Fig. 8, mounted on an upright shaft 52 suitably journalled in the frame of the machine and connected by means of a bevel gear 53, Fig. 2, to a bevel pinion 54 mounted on the shaft of a driving motor or other source of power 55.

The rotary disk or ring 35 of the rotary holder or chuck may be journalled on the machine in any suitable or desired manner, for example, an annular bearing plate 57 may be employed having a dished portion provided with a ball race in which ball bearings 58 operate, the outer flanges of the annular bearing member 57 being secured in any suitable manner to a supporting plate 59 which is suitably secured on the frame of the machine. The upper face of the rotary disk or member 35 is engaged by means of a ring 60 suitably mounted on the upper face of the supporting plate 59 so that the ring 60 and the ball bearings support the rotary plate 35 in its operative position. Any other means for rotatably mounting the supporting ring or disk 35 may be provided, of course.

The fruit or article dropped into the holder must be so positioned that the upper portion thereof is below a pair of plates H H' which bring the paper around the upper portion of the fruit. To insure that the article is properly positioned, a presser foot or positioning member I is provided which is preferably made of rubber or other flexible material, which will not injure the article, and which is mounted on an upright rod 63. This presser foot and rod are actuated so that they are normally out of the path of movement of the article from the feed wheel B through the guide device C to the holder D as indicated in Fig. 3, and the presser foot may move downwardly into contact with the article, as shown in Fig. 6, to press the same into its correct position in the basket if the fall of the article into the holder has not carried the article to such position. The movement of this presser foot may be controlled by any suitable or desired mechanism. In the construction shown for this purpose, the presser foot rod 63 is pivotally supported on the outer ends of a pair of parallel links 64, 65, the other ends of which are pivoted at 66 and 67 respectively on a frame member 68 of the machine. A spring 69 normally swings the parallel links into a position in which the rod 63, connected therewith, is in its upper or inoperative position, in which the presser foot will not interfere with the dropping of the articles from the feed wheel B into the holder D. Each of these links, as clearly shown in Fig. 5, is made of two parts arranged at opposite sides of the presser foot rod 63 and the frame member 68. The links 64 and 65 are swung about their pivots 66 and 67 to lower the presser foot rod 63 by means of a two piece connecting link consisting of two parts or members 70 and 71 hinged or pivotally connected at 72. The lower end of the lower part 70 of this link is pivotally connected at 73 to one of the parallel links, for example, the link 64, and the upper end of the upper part 71 of this two piece link is pivotally connected at 74 to a vertically movable reciprocatory arm 75 extending laterally from a vertically movable rod or slide member 76. The lower part 70 is made, in the construction shown, in two pieces spaced apart and straddling the spring 69, Fig. 4, and the upper end of the upper part or link 71 is bifurcated and straddles the arm 75. The hinged connection between the two parts 70 and 71 of the connecting link includes a stop 77 on one part engaging with the other part to limit the swinging of the two parts 70 and 71 of the link to the left, as shown in Figs. 3 and 6. The stop, however, permits the parts of the link to swing freely to the right about their pivot 72, as shown in Fig. 7.

Figure 2:
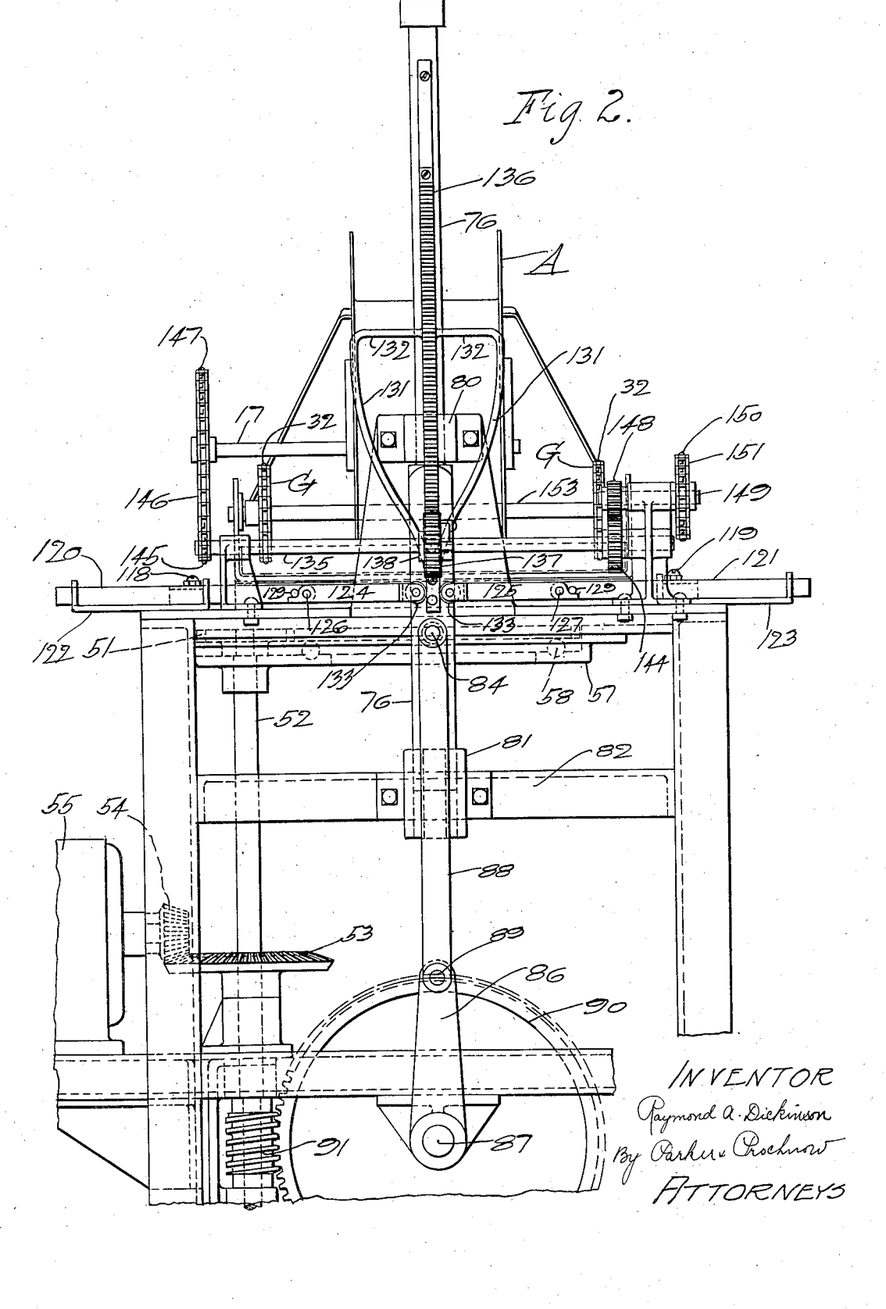
Fig. 2 is a fragmentary end elevation thereof.

The slide rod 76 is guided in its vertical movement by means of a pair of bearings or lugs 80 and 81, Figs. 2 and 3, the lower bearing 81 being secured on a cross bar or member 82 of the frame of the machine. The lower portion of this reciprocatory rod 76 is preferably square or rectangular in cross section to prevent turning of the slide rod, and the guide or bearing 81 is provided in one face thereof with a slot 83, as clearly shown in Fig. 11, so that a pin 84 (Fig. 2), secured on the slide rod 76 can pass through the slot 83 in the bearing 81.

Reciprocatory movement may be imparted to the slide rod 76 by means of a crank 86 mounted on a shaft 87 and having a connecting rod or pitman 88 pivoted at 89 on the end of the crank 86. The other end of the connecting rod or pitman is connected with the pin 84, so that rotation of the crank 86 produces reciprocatory movement of the bar 76. The shaft 87 may be rotated from the motor or other source of power in any suitable manner. For example, in the construction shown, a worm wheel 90 is secured on the shaft 87 and meshes with a worm 91 secured on the upright shaft 52, which also rotates the article holder D. The downward movement of the slide rod 76 and arm 75, communicated by means of the two piece link to the link 64 which produces downward movement of the presser foot is controlled by means of a chain or flexible connection 94 which is connected at 95 to the upper part of the rod 63 and at 96 to the upper member 71 of the hinged connecting link. Consequently, after a limited downward movement of the presser foot and rod 63, sufficient to lower the article X to the desired extent in the holder D, the chain or tension member 94 becomes tight, as shown at Fig. 6, and causes the two parts 70 and 71 of the connecting link to swing about the hinge 72, whereupon the spring 69 will move the rod 63 and presser foot I upwardly.

Figure 9:
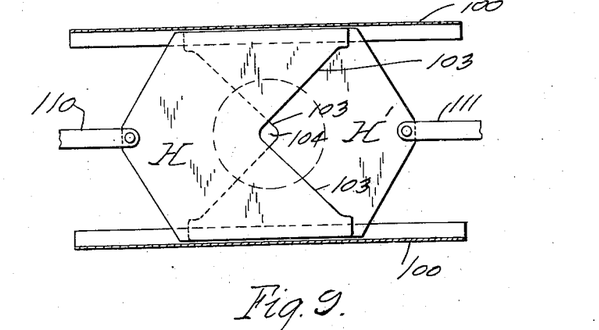
Fig. 9 is a fragmentary plan view thereof on line 9—9, Fig. 3, showing the means for twisting the paper around the article.

After the article has been properly positioned in the basket D, the sheet Y' is folded around the upper portion of the article, and for this purpose the two plates H and H' are preferably employed. These plates are slidable laterally of the machine in guides 100 depending from a plate 101 rigidly mounted on the frame of the machine and having an opening 102 therein through which the article may pass on its way to the holder D. The plates H and H' are provided with V-shaped inner edges 103 facing toward each other and so arranged that when the two plates are separated, the article to be wrapped will pass between the opposed V-shaped edges 103, and the upper portion of the sheet will extend above these edges of the plates, as clearly shown in Fig. 3. When these plates are brought together, the V-shaped edges will move the edge portions of the sheet over the upper portion of the article until the plates reach their innermost positions, shown in Fig. 9, in which the upper part of the sheet will extend through a comparatively small hole or space 104 between the opposite V-shaped edges 103 of the plates. Since the article and the sheet are rotated by the holder D, and the plates H and H' are stationary, the portion of the paper extending through the small opening 104 between the two plates will be twisted, so that the upper edges of the sheet will be held together by the twisted portions thereof.

Figure 10:
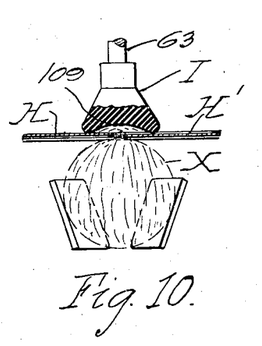
Fig. 10 is a fragmentary, detached elevation showing the twisted portion of the wrapper being flattened or compressed.

The twisted part of the wrapper may be compressed or clinched by the presser foot I when the same is caused to descend for the second time, and this compressing of the twisted part of the wrapper may be accomplished while the two plates H and H' are in engagement with the wrapper. This second downward movement of the presser foot is effected in the particular construction shown by the further or continued downward movement of the slide rod 76 and its arm 75 after the two parts 70 and 71 of the connecting link have been swung about their hinge or pivot. The upper end of the presser foot rod 63 then is engaged by the end portion 107 of the arm 75, this end portion preferably being provided in the under face with a slot 108 into which the upper end of the rod 63 is adapted to enter. Consequently, the presser foot I will be moved downwardly against the portion of the wrapper extending above the plates H and H', as indicated in Fig. 10, and preferably the lower face of the presser foot I is dished or concave, as indicated at 109 so that the portion of the wrapper extending above the plates H and H' is pressed downwardly against the plates, thus knotting or fixing the twist in the wrapper, so that the wrapper will be securely held on the article. As soon as this has been accomplished, the plates H and H' are quickly moved laterally out of engagement with the wrapper, whereupon the further downward movement of the presser foot I pushes the wrapped article downwardly out of the holder D and into any suitable discharge, not shown. After the ejection of the wrapped article, the crank 86 begins to move the slide rod 76 upwardly, thus drawing the two parts 70 and 71 of the connecting link into alinement, so that this part of the machine is ready for the next operation.

Figures 11, 12, 13:
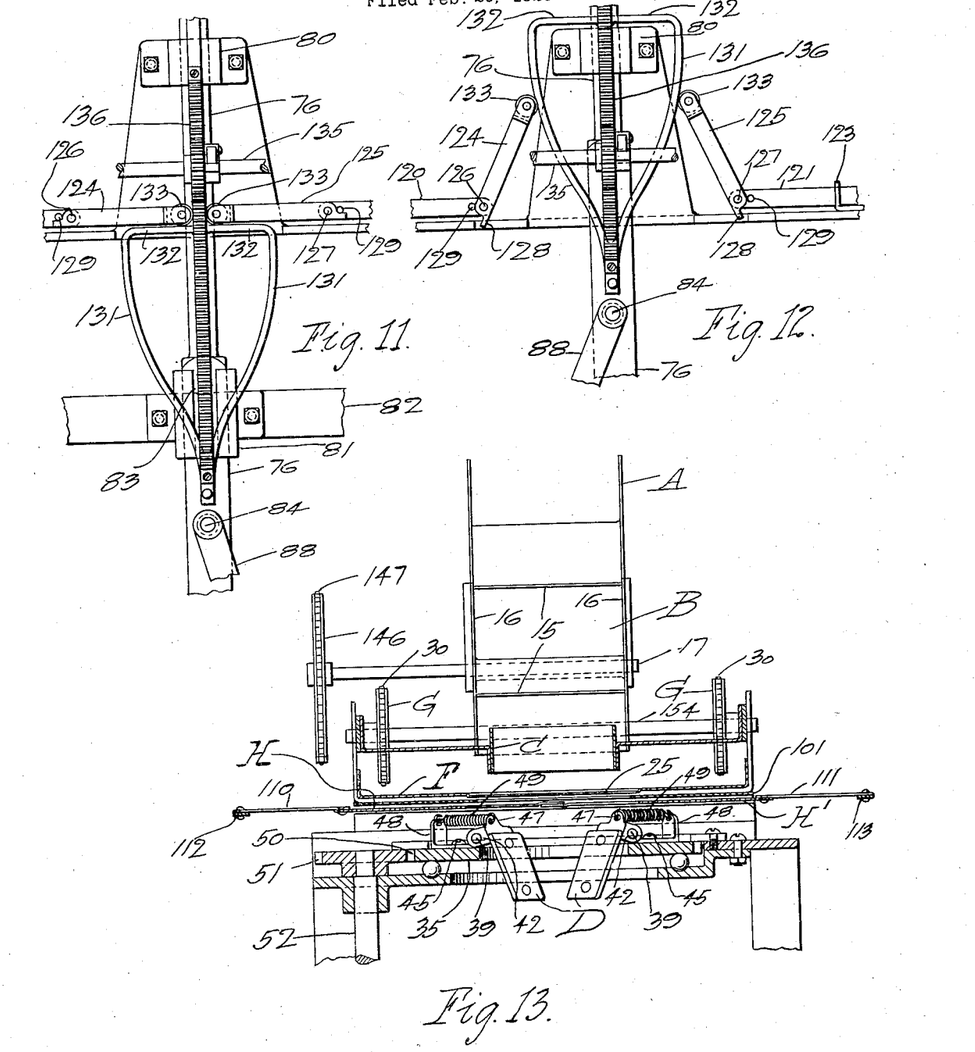
Figs. 11 and 12 are fragmentary front elevations thereof showing part of the machine in different positions.
Fig. 13 is a transverse, sectional elevation thereof on line 13—13, Fig. 1.

The movement of the plates H and H' toward and from each other to effect the twisting of the wrapper in the upper part of the article may be effected by any suitable or desired mechanism. In the construction shown for this purpose, the plates H and H' have outwardly extending links 110 and 111 pivotally connected to the outer ends thereof, which links are pivoted at their outer ends to levers 112 and 113, respectively, pivoted at 114 and 115 on a suitable part of the frame of the machine. The other ends of these levers are bifurcated or slotted, as indicated at 116 and 117. Pins 118 and 119 enter into the slotted ends of the levers and these pins are secured to and move with slide links 120 and 121 which are guided in suitable brackets 122 and 123, secured on a part of the frame of the machine. Extensions or swinging links 124 and 125 are pivoted at 126 and 127 respectively to the inner ends of the slide links 120 and 121, and the swinging links 124 and 125 are adapted to swing upwardly only, as shown in Fig. 12, the downward swinging of these links with reference to the slidable links 120 and 121 being prevented by means of suitable stop projections 128 on the swinging links or arms 124 and 125 adapted to engage with pins or other fixed portions 129 of the sliding links 120 and 121.

Figure 1:
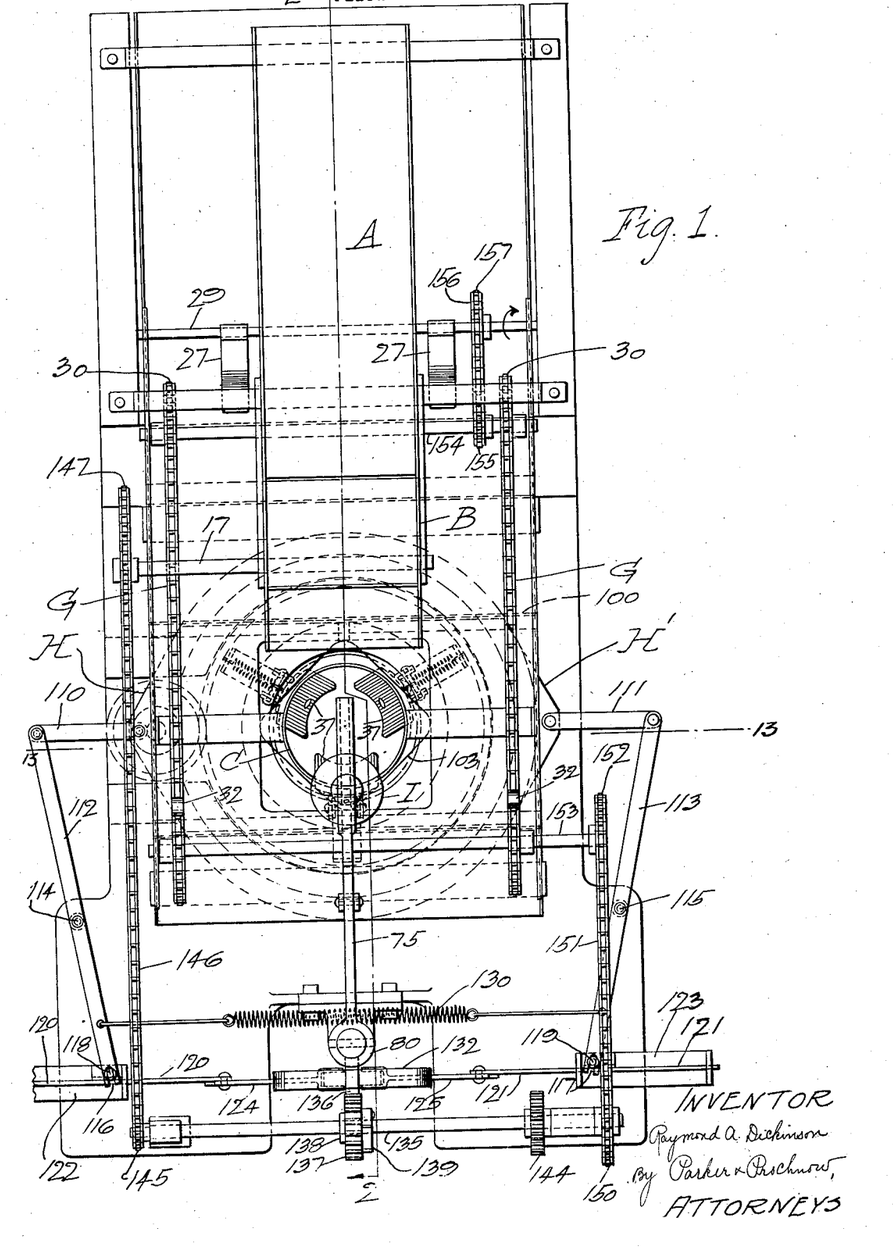
Fig. 1 is a top plan view of a wrapping machine embodying my invention.

The levers 112 and 113 are normally held in the positions shown in Fig. 1 in which the feed holding plates H, H' are separated by means of a spring 130, connected with the two levers. This spring acting on the levers 112, 113 holds the slides 120, 121 in their inner positions, and these slides are moved outwardly against the action of the spring 130 to swing the levers 112, 113 on their pivots by means of a cam 131 which reciprocates vertically and for this purpose is mounted on the slide rod 76. The sides of the cam are inclined as shown, converging towards their lower ends, and the upper end of the cam terminates abruptly transversely of the direction of movement of the cam in inwardly extending portions 132. This cam is adapted to engage with anti-friction rollers 133 journalled on the inner ends of the swinging links 124, 125, pivoted on the slide members 120, 121. When this cam is in its upper position as shown in Fig. 2, the slides 120, 121 are in their inner positions, in which positions the sheet folding plates are separated so that the sheet and the article to be wrapped can pass between the same into the holder D. As the cam 131 begins to move downwardly, the inclined sides thereof engage with the rollers 133 of the pivoted arms 124, 125 and move these arms together with the slide members 120, 121 outwardly, which motion is transmitted by the levers 112, 113 to the plates H, H', causing these plates to move inwardly to gather the paper above the upper portion of the article. When the twisting together of the sheet at the top of the article has been completed, the upper abrupt portion 132 of the cam passes below the rollers 133 as indicated in Fig. 11, whereupon the spring 130 swings the levers 112, 113 into positions to move the plates H, H' outwardly and the slides 120, 121 toward each other. Upon the return upward movement of the cam 131, the abrupt upper portion 132 thereof presses upwardly against the swinging links 124, 125 and causes the same to swing upwardly as indicated in Fig. 12 without imparting any motion to the slides 120, 121, or to the plates H, H', this motion takes place during the feeding of the sheet and article to the holder D, and when this cam again reaches its upper position as shown in Fig. 2, the links 124, 125 will drop down until the stop portions 128 thereof engage the stop pins 129, as shown in Fig. 2, whereupon this mechanism is ready to repeat the operation. Other means for actuating the plates H, H' may of course, be employed, if desired.

135 represents an intermittently rotating drive shaft from which the feed mechanism for feeding the articles and the sheets are propelled, and this drive shaft in the particular construction shown is driven from a rack 136, also mounted on the slide rod 76 and meshing with a pinion or gear 137. This gear is loosely journalled on the shaft 135, being held against endwise movement in one direction by means of a collar 138 secured on the shaft, and against movement in the opposite direction by means of a notched disk 139 rigidly secured on the shaft 135, this disk having a recess or notched portion 140 with which a dog or detent 141 may engage, the dog being pivotally mounted on this gear 137 and yieldingly pressed into engagement with the disk 139 by means of a spring 142, see particularly Fig. 3. When the slide rod 76 is moved downwardly, during which movement the paper is brought over the upper portion of the article and twisted and secured thereto, the gear 137 operates in a clockwise direction, see Fig. 3, so that the pawl or dog 141 imparts no rotation to the disk 139, thus permitting the shaft 135 to remain stationary. During the upward movement of the rack bar 136, the gear 137 is turned in a contra-clockwise direction in Fig. 3, thus causing the dog or latch 141 to engage in the recess 140 in the disk 139 and impart movement in a contra-clockwise direction to the shaft 135.

The shaft 135 is provided at its left end in the construction shown in Figs. 1 and 2 with a sprocket wheel 145 cooperating with a sprocket chain 146 which in turn meshes with a sprocket wheel 147 arranged on a shaft 17, on which the feed wheel B is mounted, the sprocket wheel 147 being much larger than the sprocket wheel 145, so that the entire upward movement of the rack bar produces a quarter revolution of the feed wheel B and thus feeds an article from the supply trough A to the holder D.

The intermittently rotating shaft 135 is also provided with a gear 144 cooperating with a gear 148 mounted on a counter shaft 149, suitably journalled on the frame of the machine, and this counter shaft has a sprocket wheel 150 secured thereto which meshes with a sprocket chain 151 which also engages with a sprocket gear 152 and mounted on a shaft 153 to which the sprocket wheel 31 of the paper feed chain is secured. In this manner intermittent movement is transmitted to the sprocket chain G so that the friction lugs 32 thereof move a sheet along the table or plate F into a position over the holder D, prior to the completion of the quarter revolution of the article feed wheel B.

The two sprocket wheels 30 of the paper feed mechanism are mounted on a shaft 154 on which a sprocket wheel 155 is mounted which meshes with a sprocket chain 156 which also passes over a sprocket wheel 157 secured on a shaft 29 on which the paper advancing brushes or wipers 27 are mounted which pass the top sheet of the stack Y forwardly so that the leading edge of the sheet will be positioned on the table or plate F ready to be engaged by the friction lugs 32 of the sprocket chain D, the gear ratio between the sprocket wheels 155 and 157 being such that the wiping brushes 27 turn through one revolution for each operation of the machine. Other means for actuating the sheet and article feeding mechanism may, of course, be provided, if desired.

The machine is so constructed that it can be operated at a high rate of speed and very effectively and securely wrap the article, completing the wrapping operation by twisting the paper or other wrapper so that the same will not become removed in the course of ordinary handling. Furthermore, the machine is of strong and rugged construction and contains no parts which require the use of great accuracy in constructing the same, or which are subject to excessive wear.

Claims:

1. An article wrapping machine comprising a support having an aperture through which the article may pass, means for placing the sheets in which the article is to be wrapped successively upon said support over said aperture, means for guiding the articles to be wrapped successively upon said support and a deposited sheet, means located below said support in approximate alignment with said aperture for receiving and frictionally holding said articles, means for forcing each deposited article and the sheet upon which it is deposited, and in which it is to be wrapped, together through said aperture into said holding means in one movement and subsequently in another movement through said holding means, means between said support and said article holding means for gathering together the edges of the sheet of any article in said holding means, and means for causing relative movement of said holding means and said gathering means for twisting together said gathered free edges.

2. An article wrapping machine comprising a support having an aperture through which the article to be wrapped may pass, means for depositing in succession upon said support and over said aperture the sheets in which the articles are to be wrapped, means for depositing the articles in succession upon said support and sheet, an article holder located adjacent the support for receiving from said aperture and frictionally holding an article and its sheet, said holder permitting passage of said article and sheet completely therethrough by pressure upon said article, means for forcing said article and sheet through said aperture and into said holder during one stage of its movement, and completely through said holder at another stage of its movement in the same direction, means located between the holder and the support for gathering together the edges of a sheet when the article and that sheet are forced together into said holder, and means for causing relative rotation of said holder and gathering means to twist together the edges of the sheet.

3. In an article wrapping machine, the combination of a revolving holder for the articles including a plurality of spring fingers adapted to grip the articles, means for feeding an article and a sheet of wrapping material to said holder to fold said sheet partly around said article, means for twisting together the edge portions of the sheet around the article, and means for discharging the article from said holder by deflecting said spring fingers to release the article.

4. In an article wrapping machine, the combination of a revolving holder for the articles including a plurality of gripping members adapted to grip the article, means for feeding a sheet of wrapping material into operative relation to said holder, means for feeding an article against the face of said sheet towards said holder whereby the article carries the sheet into said holder which causes the sheet to be partly folded around the article, means for twisting together the edge portions of the sheet around the article, and means for discharging the article from said holder by forcing the same past said gripping members.

5. In an article wrapping machine, the combination of a holder for the articles, means for feeding a sheet of wrapping material into operative relation to said holder, means for moving an article against the face of said sheet into said holder to carry said sheet with the article into said holder, means for bringing together the edge portions of the sheet and twisting the same, and means for compressing the twisted portion of the sheet for securing the wrapping material on the article.

6. In an article wrapping machine, the combination of a holder for the articles including a revolving ring through which the articles may pass, article gripping and supporting fingers mounted on said ring and revolving therewith and biased into positions to engage and support between them an article to be wrapped, means for feeding a sheet of wrapping material over said ring, means for dropping an article upon said sheet to cause the same to carry said sheet into engagement with said article gripping fingers, and means for folding upwardly extending edge portions of said sheet toward each other over said article, said gripping members being adapted to swing relatively to said ring to permit the wrapped article to be discharged from the holder.

7. In an article wrapping machine, the combination of a holder for the articles including a revolving ring, gripping fingers mounted on said ring and adapted to hold an article substantially in the axis of said ring, means for feeding an article and a sheet of wrapping material to said fingers to cause said wrapping material to be partly folded around the article, means for folding the edge portions of the sheet around the article and twisting the same together, and means engaging the twisted portion of said sheet to secure said twisted portion together and to eject the article from said holder.

8. In an article wrapping machine, the combination of a holder including a ring revolving about its axis, a plurality of gripping fingers mounted on said ring and extending toward the axis thereof and having parts adapted to engage an article to hold the same, means for yieldingly holding said fingers in their article gripping positions, means for twisting a sheet of material around the article while in said holder and means engaging the article after the same has been wrapped to continue the movement of the same through said holder against the action of said spring fingers.

9. In an article wrapping machine, the combination of a holder for the articles including a ring rotating about its axis, a plurality of gripping fingers mounted on said ring and adapted to engage the article to hold the same against continued movement through the holder while a sheet is being wrapped about said article, and means for adjusting said fingers toward and from the axis of said ring to adapt the machine to operate on articles of different sizes, said fingers being adapted to yield when the article is pushed through the holder after the same has been wrapped.

10. In an article wrapping machine, the combination of a revolving holder for an article including a plurality of resilient members adapted to hold the article, means for feeding the article and a sheet of wrapping material into said holder, means adapted to engage said article to depress the same into correct position in said holder, and means for bringing together the edge portions of the sheet to complete the wrapping of the sheet around the article.

11. In an article wrapping machine, the combination of a revolving holder for an article including a plurality of resilient members adapted to hold the article, means for feeding the article and a sheet of wrapping material into said holder, a presser foot adapted to position the article in said holder, and means for bringing together the edges of the sheet to complete the wrapping of the article, said presser foot pressing the wrapped article out of said holder after the wrapping operation is completed.

12. In an article wrapping machine, the combination of a holder for an article to be wrapped including a revolving ring, a plurality of article engaging members mounted on said ring, resilient pads mounted on said article engaging members and adapted to contact with the article to be wrapped, means for feeding an article and a sheet of wrapping material to said holding members, means for twisting together the edge portions of the sheet around the article, and means for ejecting the wrapped article forcibly from said holder.

13. In an article holder for an article wrapping machine, including a revolving ring, a plurality of pivoted holding members having parts adapted to engage an article to be wrapped, and a plurality of supporting brackets mounted on said ring and adjustable toward and from the axis of rotation thereof and on which said holding members are pivotally mounted.

14. In an article holder for an article wrapping machine including a revolving ring, a plurality of article engaging fingers adapted to grip an article and a sheet of wrapping material while the article is being wrapped, brackets mounted on said revolving ring and on which said fingers are pivoted to swing toward and from the article, and springs connecting said brackets and said fingers for yieldingly holding said fingers in engagement with an article.

15. In an article holder for an article wrapping machine including a revolving ring, a plurality of article engaging fingers adapted to grip an article and a sheet of wrapping material while the article is being wrapped, brackets on which said fingers are pivoted, means for adjusting said brackets toward and from the axis of rotation of said ring to adapt said holder to operate on articles of different sizes, and springs connected with said fingers and said brackets for holding said fingers yieldingly in article engaging position, said fingers being adapted to swing about said pivots against the action of said springs to permit an article to be discharged from the holder.

16. An article wrapping machine comprising a support having an aperture through which the article to be wrapped may pass, means for depositing in succession upon said support and over said aperture the sheets in which the articles are to be wrapped, means for depositing the articles in succession upon said support and sheet, an article holder located adjacent the support for receiving from said aperture and frictionally holding an article and its sheet, said holder permitting passage of said article and sheet completely therethrough by pressure upon said article, means for forcing said article and sheet through said aperture and into said holder during one stage of its movement, and completely through said holder at another stage of its movement in the same direction, means located between the holder and the support for gathering together the edges of a sheet when the article and that sheet are forced together into said holder, and means for causing relative rotation of said holder and gathering means to twist together the edges of the sheet, said gathering means and article moving means coacting with one another between said stages of movement to compress the twisted portion of the sheet.

17. In an article wrapping machine, the combination of a holder to which an article and a sheet of wrapping material may be fed and which rotates said article and said sheet, and a pair of plates arranged adjacent to said holder and slidable toward each other and having recessed edge portions which are adapted to engage the sheet and twist the edge portions of the sheet together to secure the sheet on the article.

18. An article wrapping machine comprising a plate having an aperture through which the article to be wrapped may pass, means for depositing upon said plate and over said aperture in succession the sheets in which the articles are to be wrapped, means for directing the articles in succession upon said plate over said aperture and upon a sheet, a holder member disposed at one face of the plate opposite that upon which the article is deposited and having a plurality of fingers pressed toward one another to receive and frictionally hold each article and its sheet when they are shifted together through said aperture, said fingers permitting passage of the article completely through said member by suitable pressure upon the article, gathering elements disposed between said member and plate, and operable in directions across the aperture in said plate to gather together the edges of a sheet when an article and that sheet are forced together into said member, means for causing relative rotation of said elements and said member in order to twist together the edges of the wrapper sheet and completely enclose the article, and means including a plunger operable through a series of steps in the same direction for first forcing an article and a sheet together through said aperture in the plate, and then after the twisting operation forcing them through said member.

19. An article wrapping machine comprising a plate having an aperture through which the article to be wrapped may pass, means for depositing upon said plate and over said aperture in succession the sheets in which the articles are to be wrapped, means for directing the articles in succession upon said plate over said aperture and upon a sheet, a holder member disposed at one face of the plate opposite that upon which the article is deposited and having a plurality of fingers pressed toward one another to receive and frictionally hold each article and its sheet when they are shifted together through said aperture, said fingers permitting the passage of the article completely through said member by suitable pressure upon the article, gathering elements disposed between said member and plate and operable in directions across the aperture in said plate to gather together the edges of a sheet when an article and that sheet are forced together into said member, means for causing relative rotation of said elements and said member in order to twist together the edges of the wrapper sheet and completely enclose the article, and means including a plunger operable through a series of steps in the same direction for first forcing an article and a sheet together through said aperture in the plate, then pressing the twisted edges against said elements, and then forcing said wrapped article through said member.

20. In an article wrapping machine, the combination of a revolving holder including a plurality of resilient fingers to which a sheet of wrapping material and an article to be wrapped are fed, means for twisting together the edge portions of the sheet to secure the same to an article, and ejecting means adapted to engage the twisted portion of the sheet and press the same to clinch the twisted portions while ejecting the article from said holder.

21. In an article wrapping machine, the combination of a revolving holder including a plurality of resilient fingers which are adapted to engage a sheet of wrapping material and an article and impart rotation thereto, a presser foot adapted to descend and engage the article to press the same into its correct position between said fingers, means for twisting together the edge portions of a sheet for securing the same around the article, and means for again actuating said presser foot to engage the twisted portion of said sheet and press the same against said article and at the same time eject the article from said holder.

22. In an article wrapping machine, the combination of a holder for the article, means for twisting the edge portions of a sheet of wrapping material around an article, and means for pressing the twisted portion of the sheet against twisting means for clinching the twisted portion of the sheet.

23. In an article wrapping machine, the combination of a holder including a plurality of fingers adapted to resiliently engage an article and which serve to partially fold a sheet of wrapping material around an article, means for twisting together the edge portions of a sheet above the article, and a presser foot adapted to engage the article and move the same through said holder against the action of said resilient fingers to eject the article from the machine.

24. In an article wrapping machine, the combination with a holder for an article and means for wrapping a sheet of material around the article, of a presser foot which is movable downwardly to position the article in the holder, means for moving said presser foot out of engagement with the article while the same is being wrapped, and means for moving said presser foot downwardly after the article is wrapped to eject the same from said holder.

25. In an article wrapping machine, the combination with a holder for an article and means for wrapping a sheet of material around the article, of a presser foot which is movable downwardly to position the article in the holder, means for moving said presser foot out of engagement with the article while the same is being wrapped, means for moving said presser foot downwardly after the article is wrapped to eject the same from said holder, a reciprocatory member, means actuated by the initial movement of said reciprocatory member to impart the first downward movement to said presser foot, and means actuated by the continued movement in the same direction of said reciprocatory member for imparting the final downward movement to said presser foot.

26. In an article wrapping machine, the combination with a holder for an article and means for wrapping a sheet of material around the article, of a presser foot which is movable downwardly to position the article in the holder, means for moving said presser foot out of engagement with the article while the same is being wrapped, means for moving said presser foot downwardly after the article is wrapped to eject the same from said holder, a vertically movable member, a temporary connection between said vertically movable member and said presser foot for imparting the first downward movement to said presser foot, means for interrupting said temporary connection after completion of the first downward movement of said presser foot, and means on said vertically movable member for engaging said presser foot to impart the final downward movement thereto.

27. In an article wrapping machine the combination with a holder for an article and means for wrapping a sheet of material around the article, of a presser foot which is movable downwardly to position the article in the holder, means for moving said presser foot out of engagement with the article while the same is being wrapped, means for moving said presser foot downwardly after the article is wrapped to eject the same from said holder, a vertically movably member, means connecting said presser foot and said vertically movable member for imparting two downward movements to said presser foot during one downward movement of said vertically movable member, and a cam carried by said vertically movable member for actuating said wrapping means while the article is in said holder.

28. In an article wrapping machine, the combination of a rotary holder for an article and a sheet of material to be wrapped around the same, a pair of reciprocatory plates adapted to move toward each other to twist together the edge portions of a sheet around said article, and a cam adapted to actuate said plates.

29. In an article wrapping machine the combination of a rotary holder for an article and a sheet of material to be wrapped around the same, a pair of reciprocatory plates adapted to move toward each other to twist together the edge portions of a sheet around said article, a reciprocatory cam, a hinged link with which said cam cooperates to impart movement to said plates when said cam is moving in one direction and to swing said pivoted links on their pivots without imparting movement to said plates when said cam is moving in the opposite direction.

30. In an article wrapping machine, the combination of a rotary holder for an article and a sheet of wrapping material, means for gathering the edge portions of the sheet around the article including a pair of reciprocatory plates a presser foot adapted to engage the article to eject the same from said holder when the same is wrapped, a vertically reciprocatory member having means for actuating said presser foot, and means on said vertically reciprocatory member for actuating said plates.

31. In an article wrapping machine, the combination of a revolving holder for an article, means for feeding an article to said holder, means for feeding a sheet of wrapping material over said holder and upon which the article drops on its way to said holder to carry said sheet with the article, means for twisting together the edge portions of the sheet above the article, a vertically movable member having a cam for imparting movement to said twisting means when said vertically movable member moves in one direction, a rack bar carried by said vertically movable member, a shaft to which said rack bar imparts rotation when said vertically movable member moves in the opposite direction, and connections between said shaft and said sheet and article feed mechanisms.

32. In an article wrapping machine, the combination of a revolving holder for an article, means for feeding an article to said holder, means for feeding a sheet of wrapping material over said holder and upon which the article drops on its way to said holder to carry said sheet with the article, means for twisting together the edge portions of the sheet above the article, a vertically movable member having a cam for imparting movement to said twisting means when said vertically movable member moves in one direction, a rack bar carried by said vertically movable member, a shaft to which said rack bar imparts rotation when said vertically movable member moves in the opposite direction, connections between said shaft and said sheet and article feed mechanisms and a presser foot actuated by the downward movement of said vertically movable member for ejecting an article from said holder.

33. In an article wrapping machine, the combination of a holder adapted to yieldingly hold an article while the same is being wrapped, a presser foot adapted to move downwardly before the article is wrapped to position the same in said holder, and to move downwardly again to push the article out of said holder after the same is wrapped, a vertically reciprocatory member connected with said presser foot by means of a link consisting of two parts pivoted together, means for swinging said parts of said link about said pivot to break the connection between the vertically reciprocatory member and said presser foot after the completion of the first downward movement of said presser foot, resilient means for drawing said presser foot upwardly after the swinging of said parts of said link about said pivot, and a part on said vertically movable member adapted to engage said presser foot to move the same downwardly to eject the article upon further downward movement of said reciprocatory member.

34. An article wrapping machine comprising a plate having an aperture through which the articles may pass and against which an article, and a sheet in which it is to be wrapped may be placed with the sheet obstructing movement of the article through the aperture, a support adjacent the plate and having an aperture through which the articles also may pass, arms carried by said support and extending into the aperture of said support, spring means for urging said arms toward one another to obstruct passage of the articles through the support aperture, gathering means disposed between the support and the plate for gathering together the edges of a sheet when the sheet and an article are forced together through the plate and into engagement with said arms, means for causing relative rotation of said gathering means and said support for twisting together the gathered edges of said sheet, and a plunger mounted for operation through the aperture of said plate for engaging and forcing an article and its sheet through said plate and into engagement with said arms where said article may be wrapped in said sheet and then for forcing the wrapped article completely through said support in order to disengage it therefrom.

35. An article wrapping machine comprising a member having an aperture through which the articles may pass, supporting elements mounted on said member and shiftable toward and from the aperture, article engaging members carried by said elements for engaging and frictionally holding an article that may be forced therebetween into said aperture, and permitting disengagement of the article by continued movement through said aperture, means for forcing an article against a sheet in which it is to be wrapped, into said aperture and between said article engaging members, means for gathering together the edges of the sheet when the article and sheet are inserted between said article engaging members, and means for causing relative movement of said apertured member and said gathering means to twist together the edges of the wrapper sheet, said adjustment of the elements determining the size of the article which will be received and frictionally held by said arms.

36. An article wrapping machine comprising a plate having an aperture through which the articles may pass and upon which an article and its sheet may be placed, a ring disposed beneath said plate and through which said articles may pass, arms hinged to said ring and extending into the ring passage, springs normally urging said arms toward one another to obstruct the passage through said ring, and to receive between them and yieldingly hold an article passing into the ring, gathering members supported between the plate and said ring and movable toward one another for gathering together the edges of the sheet after a sheet and an article have been forced through the plate and into the space between said arms, means for moving the gathering members toward one another to collect together the edges of the sheet and means for causing relative rotation of said members and ring in order to twist together the gathered edges of the sheet.

37. An article wrapping machine comprising a plate having an aperture through which the articles may pass and upon which an article and its sheet may be placed, a ring disposed beneath said plate and through which said articles may pass, arms hinged to said ring and extending into the ring passages, springs normally urging said arms toward one another to obstruct the passage through said ring and to receive between them and yieldingly hold an article passing into the ring, gathering members supported between the plate and said ring and movable toward one another for gathering together the edges of the sheet after a sheet and an article have been forced through the plate and into the space between said arms, means for moving the gathering members toward one another to collect together the edges of the sheet, and means for causing relative rotation of said members and ring in order to twist together the gathered edges of the sheet, said arms being adjustable toward one another to vary the size of article which it will receive and hold.

38. An article wrapping machine comprising a plate havng an aperture through which the articles may pass and upon which an article and its sheet may be placed, a ring disposed beneath said plate and through which said articles may pass, arms hinged to said ring and extending into the ring passage, springs normally urging said arms toward one another to obstruct the passage through said ring and to receive between them and yieldingly hold an article passing into the ring, gathering members supported between the plate and said ring and movable toward one another for gathering together the edges of the sheet after a sheet and an article have been forced through the plate and into the space between said arms, means for moving the gathering members toward one another to collect together the edges of the sheet, means for causing relative rotation of said members and ring in order to twist together the gathered edges of the sheet, and means including a plunger for forcing an article and sheet through said plate and into engagement with said arms, and then subsequently completely through said ring.

39. In an article wrapping machine, a rotating holder for an article to be wrapped, said holder including a plurality of members cooperating with one another for receiving and yieldingly mounting the articles, means for feeding the article and a sheet of wrapping material into said holder, a presser foot movable to place the article and sheet into said holder, means for collecting together the edges of the sheet to complete the wrapping of the article in said holder, and means for operating said presser foot first to place an article and a sheet in said holder, then into contact with the collecting means to press the collected edges of the sheet together to complete the wrapping and then to force the article out of the holder after the wrapping operation is completed.

40. In an article wrapping machine, a holder, means for positioning an article to be wrapped and the sheet in which it is to be wrapped in a position adjacent said holder, means for collecting together the edges of the sheet after the sheet and article pass into said holder, means for causing relative movement between said collecting means and said holder for twisting together the edges of the sheet in order to complete the wrapping, a presser device including a member movable in an approximately straight direction for engaging an article and sheet and forcing them into the holder, and then ejecting them from said holder, a spring for yieldingly retracting the presser device into an inactive position, and operating member movable generally in the direction of movement of said presser member, a pair of toggle links hinged to said operating member and presser device, and limited against movement materially beyond dead center position in one direction, for transmitting movement between said operating member and presser device to insert an article and a sheet into the holder when the toggle links are in substantial alignment with one another, a flexible member connecting one of the toggle links and said presser member for breaking said toggle connection after a predetermined movement in the direction in which the presser member forces an article into the holder, said operating member and said presser member having parts interengaging after breaking of the toggle connection and after a desired movement of the operating member in the same direction, whereby said presser member will be given a further movement to eject the wrapped article from the holder, said spring serving to retract the presser member automatically upon the breaking of the toggle connection before the following engagement of the operating and the presser members.

41. In an article wrapping machine, a holder for receiving an article and a sheet in which it is to be wrapped, a twisting device for gathering together the edges of the sheet which is in said holder to complete the wrapping of the article while in the holder, means for causing relative movement between the twisting device and said holder in order to twist together the gathered edges, a support, a plunger, a pair of links hinged to said plunger and to said support so as to mount said plunger for movement in a direction to force an article and sheet into said holder and then upon further movement in the same direction eject the article from said holder, an operating member mounted for reciprocation in the direction of movement of the plunger, a toggle link connection between said operating member and one of said links and limited against movement in one direction materially past dead center, whereby movement of the operating member will be transmitted through said toggle connection and one of said links to said plunger when the toggle connection is straightened out, a spring connected between the support and one of said links for yieldingly retracting the plunger, and a connection between one of the links of the toggle connection and said plunger for breaking the toggle connection after a definite movement of the plunger by said operating member, whereupon the plunger will be retracted by the spring, said operating member having a portion engaging with the plunger to move it farther in the same direction after continued movement of the operating member of a definite duration.

42. In an article wrapping machine, a holder for receiving an article and a sheet in which it is to be wrapped, a twisting device for gathering together the edges of the sheet which is in said holder to complete the wrapping of the article while in the holder, means for causing relative movement between the twisting device and said holder in order to twist together the gathered edges, a support, a plunger, a pair of links hinged to said plunger and to said support so as to mount said plunger for movement in a direction to force an article and sheet into said holder and then upon further movement in the same direction eject the article from said holder, an operating member mounted for reciprocation in the direction of movement of the plunger, a toggle link connection between said operating member and one of said links and limited against movement in one direction materially past dead center, whereby movement of the operating member will be transmitted through said toggle connection and one of said links to said plunger when the toggle connection is straightened out, a spring connected between the support and one of said links for yieldingly retracting the plunger, a connection between one of the links of the toggle connection and said plunger for breaking the toggle connection after a definite movement of the plunger by said operating member, whereupon the plunger will be retracted by the spring, said operating member having a portion engaging with the plunger to move it farther in the same direction after continued movement of the operating member of a definite duration, a cam device operable with said operating member, and means controlled by the cam device for operating said twisting device to collect the edges of the sheet after the article is first forced into the holder and to quickly release the same after a predetermined extent of movement of the plunger in ejecting the article, whereby the first contact of the plunger with the twisting device will compress the twisted edges of the sheet.

43. In an article wrapping machine, a holder through which an article and sheet in which it is to be wrapped may be forced and capable of holding the article and sheet yieldingly when forced therein, a plurality of gathering members mounted adjacent the holder for gathering together the edges of the sheet after the sheet and an article are forced into said holder, means for causing relative movement of said gathering members and holder in order to twist the gathered edges, means for forcing an article and a sheet in which it is to be wrapped first into said holder, and then ejecting it therefrom during a subsequent movement in the same direction, including a reciprocating operating member, an element mounted for movement transversely of the movement of said reciprocating member, an arm hinged to said element for movement in a plane parallel to the movement of said operating member, means for limiting angular movement of the arm in one direction past the position in which the arm is parallel with said element, a cam carried by said operating member and engaging with said arm to force said element in one direction through the action of said limiting means in preventing rotation of the arm in one direction, the surface of said cam merging sharply into a dwell portion into which the arm may move after serving as an interponent in the movement of said element by said cam, a spring for urging said element in a direction to press the arm against the cam, means connecting said element and said gathering members to cause their movement together, whereby after a definite movement of said operating member and said gathering members, the latter will be quickly released and moved out of the path of said forcing means as the arm drops into the dwell of the cam, said hinged connection between the arm and element permitting rocking of the arm by the cam without operation of said element during return movement of said operating member.

RAYMOND A. DICKINSON.